Oct. 21, 1924.                                               1,512,752
C. M. FISK
LIQUID LEVEL INDICATOR
Filed Jan. 12, 1923
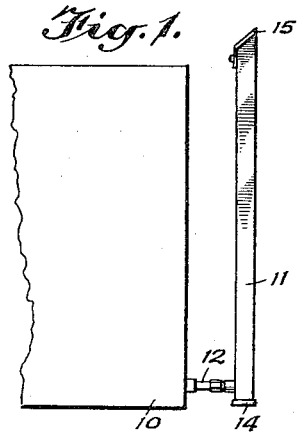
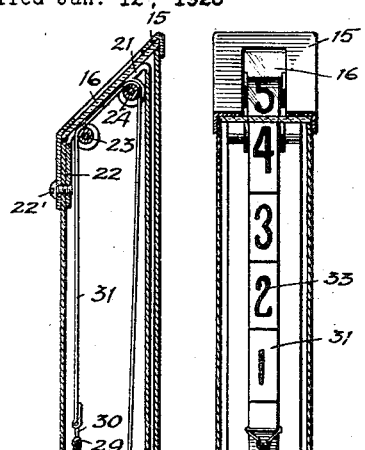
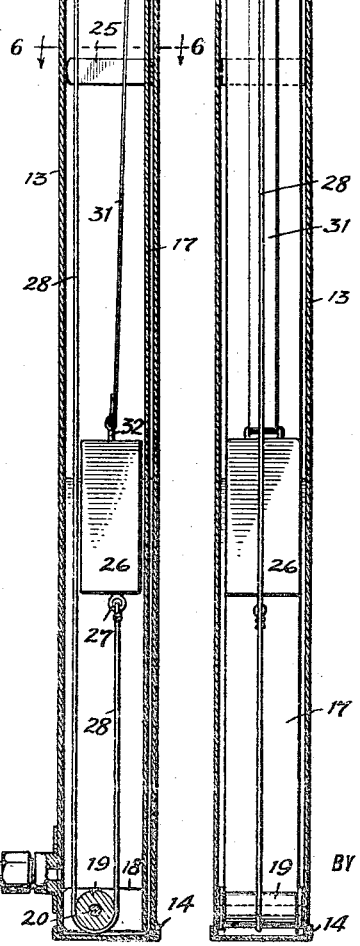
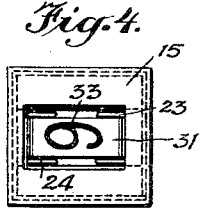
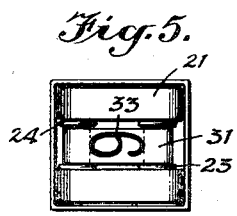
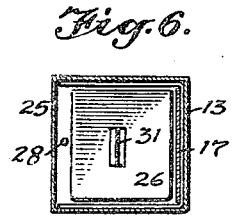
WITNESSES
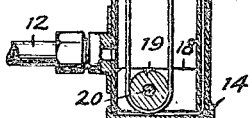
INVENTOR
C. M. FISK
BY
ATTORNEYS Patented Oct. 21, 1924.

1,512,752

UNITED STATES PATENT OFFICE.

CASSIUS M. FISK, OF LIBERTY CENTER, OHIO.

LIQUID-LEVEL INDICATOR.

Application filed January 12, 1923. Serial No. 612,225.

*To all whom it may concern:*

Be it known that I, CASSIUS M. FISK, a citizen of the United States, and a resident of Liberty Center, in the county of Henry and State of Ohio, have invented a new and Improved Liquid-Level Indicator, of which the following is a full, clear, and exact description.

The present invention relates to new and useful improvements in gages, and it pertains more particularly to a gage for indicating the volume of liquid in a tank, and has its particular use in connection with fuel tanks or oil tanks of motor vehicles.

It is one of the primary objects of the invention to provide a gage by means of which the volume of gasoline or other liquid contained in a tank may be read from a position exterior of the tank.

It is a further object of the invention to construct the device so that the readings will be so positioned as to be clear and distinct to the eye of the observer.

It is a further object of the invention to construct the device so that it is capable of use with tanks of any type, a mere changing of the element carrying the readings being all that is necessary to adapt it to various types of tanks.

It is a further object of the invention to provide a device which is an article of manufacture and may be sold separately for attachment to tanks or may be offered as a part of a tank, as desired.

With the above and other objects in view, reference is had to the accompanying drawings, in which—

Figure 1 is a detail view in elevation on a reduced scale, of a portion of a tank showing the improved gage attached thereto;

Fig. 2 is a longitudinal sectional view of the gage mechanism;

Fig. 3 is a similar view taken at right angles to Fig. 2;

Fig. 4 is a top plan view of the device with the upper cap thereof in place;

Fig. 5 is a similar view with the upper cap removed;

Fig. 6 is a detail sectional view taken on the line 6—6 of Fig. 2.

Referring more particularly to the drawings, the reference character 10 designates a tank such as employed for containing gasoline, oil or the like, and 11 designates a gage, which gage is connected to the tank by means of a length of pipe 12. The gage 11 comprises a housing 13, which housing while shown as rectangular in cross-sectional form, may be of any desired cross-sectional shape. This housing has its lower end closed by means of a cap 14, and its upper end closed by means of a cap 15, which cap 15 has a transparent window 16, or the like.

Mounted within the housing 13, is a strip of metal 17, which extends throughout the length of the housing. This strip of metal has at its lower end two ears 18 struck therefrom, and mounted in said ears 18 is a roller 19 mounted on a pin or shaft 20. The upper end of the strip of metal 17 is angularly disposed with respect to the body portion, as indicated by the reference character 21, and said upper end has a depending extremity 22. The cap 15 and the depending extremity 22 are secured to the front wall of the housing 13 by means of a screw 22', or the like. The angular portion 21 of the upper end of the strip 17 is provided with a slot, and mounted on the under face of said angular portion are two rollers 23 and 24. Intermediate of the ends of the strips 17 are two arms 25 serving as braces to prevent a buckling of the strips 17.

The reference character 26 designates a float, and connected to the lower end of the float as by an eye 27, is a cord 28. This cord 28 extends around the roller 19 and is connected as at 29 by a suitable clip 30, to a tape 31. This tape 31 passes around the rollers 23 and 24, and is secured as by an eye 32, to the upper end of the float 26. As more clearly shown in Fig. 3, the tape 31 is provided with a plurality of designating characters 33, which serve the purpose of indicating the position of the float with respect to the transparent window 16 in the upper end of the housing 13.

The plate 15 which serves to close the upper end of the housing is angularly disposed as shown in order that the tape in passing over the rollers 23 and 24 will assume a slanting position which serves to render the designating characters of the tape more readily readable.

The device is adapted to be connected to the tank, as heretofore stated, by means of the pipe connection 12, and when so connected it is obvious that the liquid in the tank will likewise rise to the same level in the housing 13. Upon a rising of the liquid in the housing 13, the float 26 will rise and display the proper designating character 33 opposite the window 16. As the level of liquid falls in the tank, it will likewise fall in the housing, and the float will descend with this fall in liquid and will give a decrease reading on the tape 31 beneath the window 16.

From the foregoing it is apparent that the present invention provides means whereby the volume of gasoline, oil, or other liquid contained in the tank may be ascertained readily without opening the same.

It is further apparent that by changing the arrangement of the designating characters 33 on the tape 31, the device may be employed in connection with tanks of various sizes and shapes.

What is claimed is:

1. A device of the character described comprising a housing, a float movable in said housing, a designating tape connected to said float, a plurality of pulleys about which said tape is adapted to move to display the designating characters thereon, and means for supporting said pulleys within the housing, said means comprising a removable strip adapted to be received within the housing.

2. In a gage of the class described, a housing, a strip removably carried thereby, a plurality of braces carried by said strip and adapted to engage the walls of the housing to prevent collapsing thereof, a plurality of pulleys carried by said strip, a tape adapted for movement around said pulleys, and a float connected to said tape whereby upon rise and fall of the float the tape will be moved about the pulleys.

3. In combination with a housing, a gage mechanism support comprising a strip of metal adapted to be received within the housing, a pair of spaced ears carried by the lower end of said strip of metal, a roller mounted between said spaced ears, an angular extension formed on the upper end of said strip of metal, a plurality of rollers carried by said angular extension, a plurality of braces intermediate the ends of said strip of metal and adapted to engage the side walls of the housing to strengthen the same, a tape passing around the rollers carried by the angularly disposed end of said strip of metal, a cord connected to one end of the tape and extending around a roller carried by the lower end of said strip of metal, and a float, said float being connected to said cord and to said tape in such a manner that movement of the float will move the tape, as and for the purpose set forth.

4. In a gage for tanks, a housing having an angularly disposed upper face, a strip of metal adapted to be received within said housing and having an angularly disposed upper end terminating in an extremity parallel with one of the walls of said housing, a removable cap for closing the upper end of said housing, a window secured in the upper end of said housing by said removable cap, a portion depending from said cap and in parallelism with the extremity of said metal strip and the wall of the housing, and a fastening extending through the depending portion of the cap, the wall of the housing and the depending end of the metal strip to secure the same together.

5. In a gage, a housing, a plurality of gage mechanism elements mounted within the housing, and means for mounting said gage mechanism elements, said means comprising a strip of metal removably carried by the housing and extending throughout the length thereof, and braces carried by said metal strip and adapted to engage the housing to prevent buckling of said metal strip.

CASSIUS M. FISK.